United States Patent
Nagase

(10) Patent No.: US 11,724,744 B2
(45) Date of Patent: Aug. 15, 2023

(54) VEHICLE

(71) Applicant: TOYOTA JIDOSHA KABUSHIKI KAISHA, Toyota (JP)

(72) Inventor: Toshiyuki Nagase, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 51 days.

(21) Appl. No.: 17/500,404

(22) Filed: Oct. 13, 2021

(65) Prior Publication Data
US 2022/0177037 A1 Jun. 9, 2022

(30) Foreign Application Priority Data
Dec. 8, 2020 (JP) .................. 2020-203349

(51) Int. Cl.
| | | |
|---|---|---|
| B62D 21/15 | (2006.01) | |
| B62D 25/20 | (2006.01) | |
| B62D 33/06 | (2006.01) | |
| B60K 1/00 | (2006.01) | |
| B60L 3/00 | (2019.01) | |
| B60K 1/04 | (2019.01) | |

(52) U.S. Cl.
CPC .......... B62D 21/152 (2013.01); B62D 25/20 (2013.01); *B60K 1/00* (2013.01); *B60K 2001/0438* (2013.01); *B60L 3/0007* (2013.01); *B60L 3/0061* (2013.01); *B62D 21/15* (2013.01); *B62D 33/06* (2013.01)

(58) Field of Classification Search
CPC ...... B62D 21/152; B62D 25/20; B62D 33/06; B62D 21/15; B60K 1/00; B60K 2001/0438; B60L 3/0007; B60L 3/0061
USPC .................................. 296/187.09
See application file for complete search history.

(56) References Cited

U.S. PATENT DOCUMENTS 8,740,288 B2 *  6/2014  Kamimae ......... B62D 33/0604
454/162
2020/0062133 A1    2/2020  Tsuruta et al.

FOREIGN PATENT DOCUMENTS

| JP | H09-263142 A | | 10/1997 |
|---|---|---|---|
| JP | 2000-062552 A | | 2/2000 |
| JP | 2015-116961 A | | 6/2015 |
| JP | 2015116961 A | * | 6/2015 |
| JP | 2019-073222 A | | 5/2019 |
| JP | 2020-029134 A | | 2/2020 |

* cited by examiner

Primary Examiner — Joseph D. Pape
Assistant Examiner — Dana D Ivey
(74) Attorney, Agent, or Firm — Oliff PLC

(57) ABSTRACT

A floor member is formed in an isosceles trapezoidal shape in which an upper base is shorter than a lower base, by a plate-like member, and is attached to a body of a vehicle with the upper base facing in a vehicle front direction. Respective interlocking shapes are formed at an upper base side portion of the floor member and an upper base matching part. Respective inclined shapes are formed at a lower base side portion of the floor member and a lower base matching part, such that when a force acts on the floor member from the vehicle front side, the lower base of the floor member is pushed up toward the vehicle upper rear side. A plurality of rib shapes that project upward or downward are formed at the floor member with a vehicle front-rear direction as a longitudinal direction of the plurality of rib shapes.

4 Claims, 2 Drawing Sheets

CRUSH ZONE | PROTECTION ZONE | CRUSH ZONE

VEHICLE

CROSS-REFERENCE TO RELATED APPLICATION

This application claims priority to Japanese Patent Application No. 2020-203349 filed on Dec. 8, 2020, incorporated herein by reference in its entirety.

BACKGROUND

1. Technical Field

The present disclosure relates to a vehicle and specifically relates to a cab-over type vehicle.

2. Description of Related Art

Conventionally, as vehicles of this type, cab-over type vehicles in which a drive device such as a motor is disposed under a part of a floor panel, the part being located below a driver seat, have been proposed (see, for example, Japanese Unexamined Patent Application Publication No. 2019-073222). Also, cab-over type vehicles in which a battery, a drive unit for running and a power unit electrically connected to the drive unit are disposed under a floor of a vehicle cabin have been proposed (see, for example, Japanese Unexamined Patent Application Publication No. 2020-029134).

SUMMARY

In a vehicle in which an electric motor for running is disposed under a floor of a driver seat, even when a force acts in a vehicle front-rear direction because of, e.g., a collision, the electric motor serves as a protection component against crushing, and thus, e.g., a component that is actuated by a high voltage such as a power unit is often disposed on an upper portion of the electric motor. On the other hand, the floor of the driver seat extends forward and rearward of the electric motor, and thus, parts of the floor, the parts being located forward and rearward of the electric motor, each crush upon reception of a force of compressing in the vehicle front-rear direction. Therefore, the force of compressing in the vehicle front-rear direction acts on the floor, which may cause upward bending in which the floor bulges upward or downward bending in which the floor bulges downward. If upward bending occurs, a failure to protect the driver may occur. If downward bending occurs, depending on the degree of the bending, the downwardly bent floor may abut against and damage the component under the floor.

A main object of the present disclosure is to in a vehicle in which an electric motor for running is disposed under a floor of a driver seat, when a force acts from the front side of the vehicle because of, e.g., a collision, protect an occupant and curb damage of a component under the floor.

In order to achieve the above main object, a vehicle of the present disclosure employs the following solution.

A vehicle of the present disclosure is a cab-over type vehicle including an electric motor for driving, the electric motor being disposed below a driver seat, wherein: a floor member under the driver seat is formed in an isosceles trapezoidal shape in which an upper base is shorter than a lower base, by a plate-like member, and is attached to a body of the vehicle with the upper base facing in a vehicle front direction; respective interlocking shapes are formed at an upper base side portion of the floor member and an upper base matching part that is a part of the body, the part matching the upper base side portion, such that the upper base side portion and the upper base matching part interlock with each other; respective inclined shapes are formed at a lower base side portion of the floor member and a lower base matching part that is a part of the body, the part matching the lower base side portion, such that when a force acts on the floor member from the vehicle front side, the lower base of the floor member is pushed up toward the vehicle upper rear side; and a plurality of rib shapes that project upward or downward are formed at the floor member with a vehicle front-rear direction as a longitudinal direction of the plurality of rib shapes.

In the vehicle of the present disclosure, an electric motor for driving is disposed below a driver seat. A floor member under the driver seat is formed in an isosceles trapezoidal shape in which an upper base is shorter than a lower base, by a plate-like member, and is attached to the body of the vehicle with the upper base facing in the vehicle front direction. Respective interlocking shapes are formed at an upper base side portion of the floor member and a part (upper base matching part) of the body, the part matching the upper base side portion, such that the upper base side portion and the upper base matching part interlock with each other. Respective inclined shapes are formed at a lower base side portion of the floor member and a part (lower base matching part) of the body, the part matching the lower base side portion, such that when a compressing force acts on the floor member from the vehicle front side, the lower base of the floor member is pushed up toward the vehicle upper rear side. By the upper base side portion and the lower base side portion of the floor member and the upper base matching part and the lower base matching part of the body being formed in this way, when a force acts from the vehicle front side because of, e.g., a front collision, the force from the front side acts on the floor member via the interlocking shapes and the lower base of the floor member is pushed up toward the vehicle upper rear side via the inclined shapes. As a result, the floor member moves while being slightly pushed up toward the vehicle rear side. A plurality of rib shapes that project upward or downward are formed at the floor member with a vehicle front-rear direction as a longitudinal direction of the plurality of rib shapes, and thus, the plurality of rib shapes curb upward bending or downward bending of the floor member when a force acts on the floor member from the front side. As a result, it is possible to when a force acts from the vehicle front side because of, e.g., a collision, protect an occupant and curb damage of a component disposed under the floor member. Here, examples of the "rib shapes" include, e.g., a plurality of ribs that project upward, a plurality of ribs that project downward and a plurality of ribs in which that upwardly projecting ribs and downwardly projecting ribs are alternately disposed. Examples of the plurality of ribs in which that upwardly projecting ribs and downwardly projecting ribs are alternately disposed include ribs forming a waved shape.

In the vehicle of the present disclosure, one of the interlocking shapes at the upper base side portion of the floor member and the upper base matching part may have a projecting shape and another of the interlocking shapes may have a recessed shape. Also, in the vehicle of the present disclosure, each of the inclined shapes at the lower base side portion of the floor member and the lower base matching part may be a shape in which an angle from the vehicle front lower side to the vehicle upper rear side of the shape relative to a horizontal direction is 45 degrees.

In the vehicle of the present disclosure, an angle formed by the upper base and a leg of the floor member may be an angle that is no less than 30 degrees larger than 90 degrees. Consequently, it is possible to upon a force being applied from an obliquely front side because of, e.g., a collision from the obliquely front side of the vehicle (oblique collision), make the floor member move while being slightly pushed up toward the vehicle rear side.

In the vehicle of the present disclosure, on an upper portion of the electric motor, the upper portion being located below the floor member, a housing portion that houses a high-voltage component may be provided. Consequently, it is possible to when a force acts from the front side of the vehicle because of, e.g., a collision, protect the high-voltage component.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Next, a mode for carrying out the present disclosure will be described using an embodiment.

Figure 1:
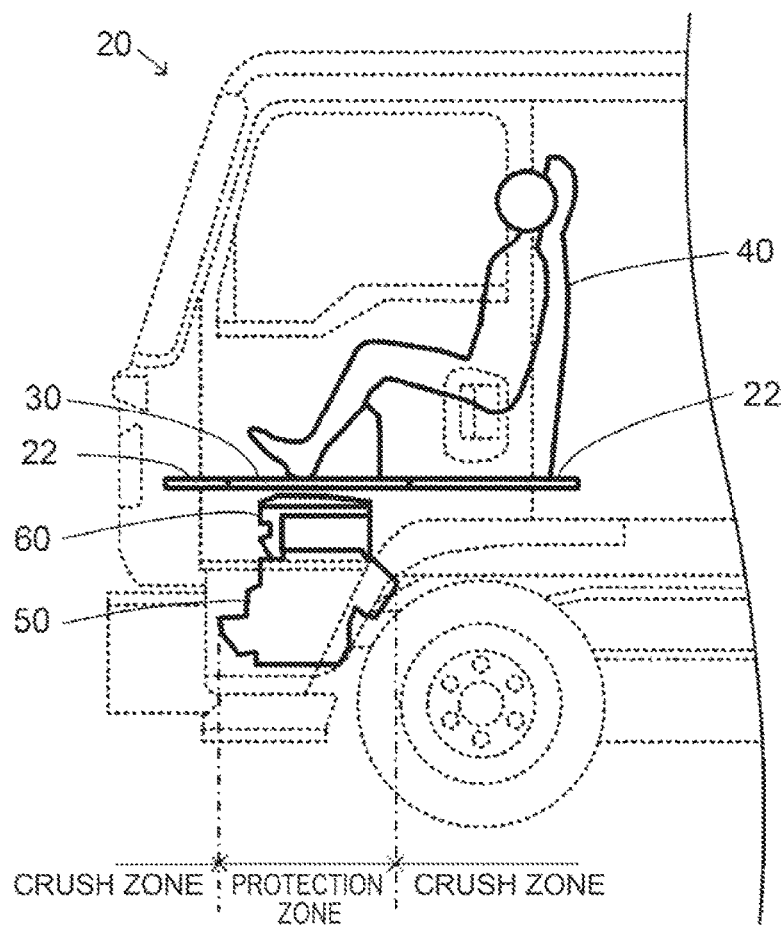
FIG. 1 is a diagram illustrating a schematic configuration of the vicinity of a driver seat of a vehicle according to an embodiment of the present disclosure.
Figure 2:
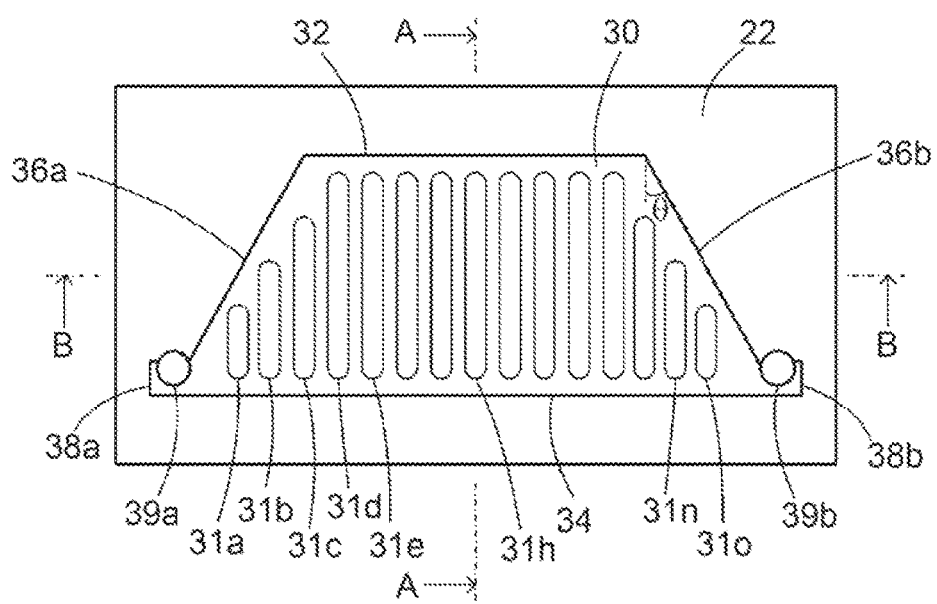
FIG. 2 is a plan view centered on a floor member 30.

FIG. 1 is a diagram illustrating a schematic configuration of the vicinity of a driver seat of a vehicle according to an embodiment of the present disclosure. FIG. 2 is a plan view centered on a floor member 30.

As illustrated in FIG. 1, a vehicle 20 is configured as a cab-over type vehicle in which a motor 50 for driving is disposed under the floor member 30 located under the driver seat 40. On an upper portion of the motor 50 under the floor member 30, a housing portion 60 that houses high-voltage components each operating with a high voltage (for example, 200V or 400V) such as an inverter and a booster circuit for driving the motor 50 is disposed. In the embodiment, the motor 50 is housed in a rigid housing, and thus, as illustrated in FIG. 1, areas forward and rearward of the motor 50 are crush zones in which crushing occurs upon reception of a force of compressing in the vehicle front-rear direction (compressing force generated by, e.g., a collision) and an area in which the motor 50 is located is a protection zone in which no crushing occurs. The high-voltage components are disposed in the protection zone in order to prevent a problem due to the high voltage from occurring as a result of the high-voltage components being damaged.

As illustrated in FIG. 2, the floor member 30 is formed in an isosceles trapezoidal shape in which an upper base portion 32 is shorter than a lower base portion 34, by a plate-like member such as a steel plate, and the floor member 30 is attached in such a manner as to be fitted in a body 22 of the vehicle 20 with the upper base portion 32 facing in a vehicle front direction. The floor member 30 is formed such that an angle θ formed by each of leg portions 36a, 36b and the upper base portion 32 is an angle that is 30 degrees larger than 90 degrees, that is, 120 degrees.

Figure 3:
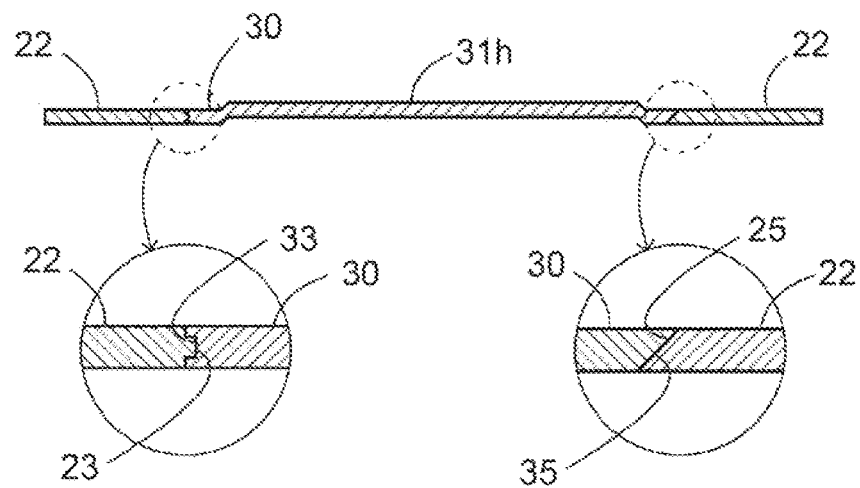
FIG. 3 is a view of a section along A-A in FIG. 2.
Figure 4:
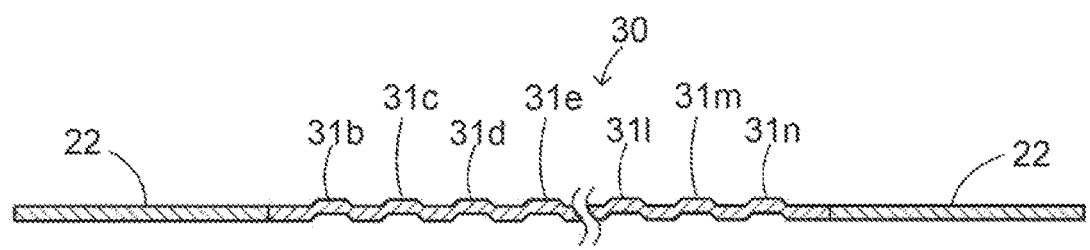
FIG. 4 is a view of a section along B-B in FIG. 2.

FIG. 3 is a view of a section along A-A in FIG. 2 and FIG. 4 is a view of a section along B-B in FIG. 2. As illustrated in FIG. 3, a side surface (upper base side portion) 33 of the upper base portion 32 of the floor member 30 is formed in a recessed shape and a part (upper base matching portion) 23 of the body 22, the part 23 matching the upper base side portion 33, is formed in a projecting shape so as to interlock with the recessed shape of the upper base side portion 33, and the upper base side portion 33 and the upper base matching portion 23 interlock with each other. In the embodiment, the recessed shape of the upper base side portion 33 and the projecting shape of the upper base matching portion 23 are referred to as interlocking shapes.

A side surface (lower base side portion) 35 of the lower base portion 34 of the floor member 30 is formed as an inclination having an angle of 45 degrees such that an upper surface of the lower base portion 34 extends to the vehicle rear side relative to a lower surface of the lower base portion 34, and a part (lower base matching portion) 25 of the body 22, the part 25 matching the lower base side portion 35, is formed as an inclination having an angle of 45 degrees such that a lower surface of the lower base matching portion 25 extends to the vehicle front side relative to an upper surface of the lower base matching portion 25. In other words, the lower base portion 34 is attached such that the inclination of the lower base side portion 35 of the floor member 30 is placed on the inclination of the lower base matching portion 25 of the body 22 from above. Therefore, when a force acts on the floor member 30 from the vehicle front side, the lower base portion 34 of the floor member 30 is pushed up toward the vehicle upper rear side. In the embodiment, the inclination of the lower base side portion 35 and the inclination of the lower base matching portion 25 are referred to as inclined shapes.

At the floor member 30, in order to enhance strength against buckling in the vehicle front-rear direction, a plurality of ribs 31a to 31o that project upward are formed with the vehicle front-rear direction as a longitudinal direction of the plurality of ribs 31a to 31o. At opposite ends of the lower base portion 34 of the floor member 30, respective crank-shaped retainer portions 38a, 38b are formed and the floor member 30 is attached such that the retainer portions 38a, 38b are held by respective bolts 39a, 39b from above.

Figure 5:
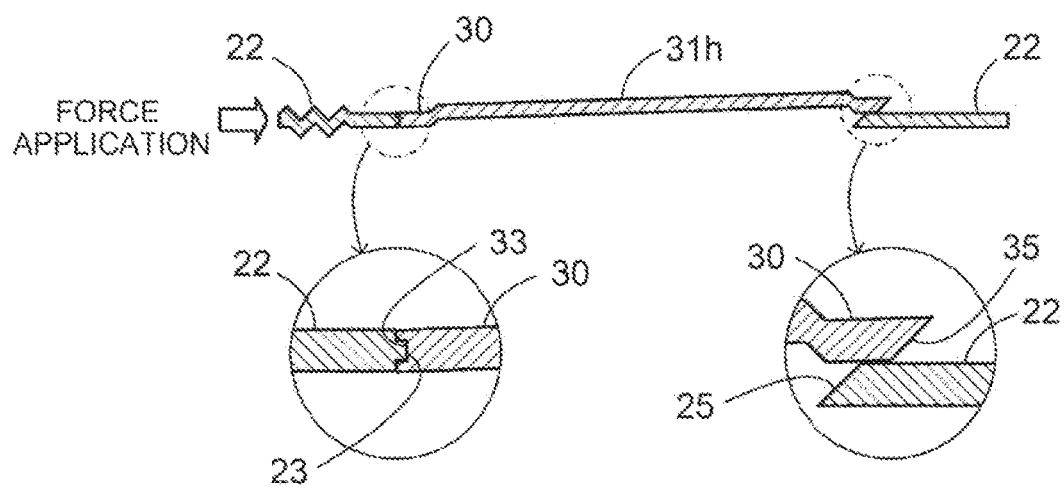
FIG. 5 is a diagram illustrating an example of a state of the floor member 30 when a force is applied from the front side of the vehicle.

Next, a case where a force acts on the vehicle 20 from the front side because of, e.g., a collision (front collision) will be considered. FIG. 5 is a diagram illustrating an example of a state of the floor member 30 when a force acts on the vehicle from the front side. Upon a force acting from the vehicle front side, a part of the body 22 in a crush zone crushes and the force acts also on the floor member 30. Since the interlocking shapes that are the recessed shape and the projecting shape are formed at the upper base side portion 33 of the floor member 30 and the upper base matching portion 23 of the body 22, and thus, the floor member 30 is pushed toward the vehicle rear side with the interlocking kept. Since the plurality of ribs 31a to 31o are formed at the floor member 30, the shape of the floor member 30 is kept against the force from the vehicle front side without being buckled. Since the inclined shapes are formed at the lower base side portion 35 of the floor member 30 and the lower base matching portion 25 of the body 22, the lower base side portion 35 of the floor member 30 moves to the vehicle upper rear side along the inclination of the lower base matching portion 25 of the body 22, that is, in such a manner as to override the lower base matching portion 25.

In this way, in the vehicle 20 of the embodiment, by the interlocking shapes being formed at the upper base side portion 33 of the floor member 30 and the upper base matching portion 23 of the body 22, the inclined shapes being formed at the lower base side portion 35 and the lower base matching portion 25 and the plurality of ribs 31a to 31o being formed at the floor member 30 with the vehicle front-rear direction as the longitudinal direction of the ribs 31a to 31o, upon reception of a force from the vehicle front side due to, e.g., a collision, the floor member 30 moves slightly toward the vehicle upper rear side with the shape kept. Therefore, it is possible to avoid a failure to protect a driver (occupant) due to the floor member 30 bending upward and it is also possible to avoid damage of the components (high-voltage components) under the floor member 30 due to the floor member 30 bending downward.

Next, a case where a force acts from an obliquely front side of the vehicle 20 because of, e.g., a collision (oblique collision) will be considered. In this case, since the floor member 30 is formed such that the angle θ formed by each of the leg portions 36a, 36b and the upper base portion 32 is an angle that is 30 degrees larger than 90 degrees (that is, 120 degrees), the floor member 30 moves slightly toward the vehicle upper rear side with the shape kept, along the leg portion on the side opposite to the leg portion that the force acts on. Therefore, in the case of an oblique collision, also, it is possible to avoid a failure to protect a driver (occupant) due to the floor member 30 bending upward and it is also possible to avoid damage of the components (high-voltage components) under the floor member 30 due to the floor member 30 bending downward.

In the cab-over type vehicle 20 of the embodiment described above, the floor member 30 is formed in an isosceles trapezoidal shape in which the upper base portion 32 disposed on the vehicle front side is shorter than the lower base portion 34 disposed on the vehicle rear side, the interlocking shapes are formed at the upper base side portion 33 of the floor member 30 and the upper base matching portion 23 of the body 22, the inclined shapes are formed at the lower base side portion 35 and the lower base matching portion 25, and the plurality of ribs 31a to 31o are formed at the floor member 30 with the vehicle front-rear direction as the longitudinal direction of the plurality of ribs 31a to 31o. Consequently, when a force acts from the vehicle front side because of, e.g., a collision, the floor member 30 moves slightly toward the vehicle upper rear side with the shape kept. As a result, it is possible to avoid a failure to protect a driver (occupant) due to the floor member 30 bending upward and it is also possible to avoid damage of the components (high-voltage components) under the floor member 30 due to the floor member 30 bending downward. Also, in the cab-over type vehicle 20 of the embodiment, the floor member 30 is formed such that the angle θ formed by each of the leg portions 36a, 36b and the upper base portion 32 is an angle that is 30 degrees larger than 90 degrees (that is, 120 degrees). Consequently, when a force acts from an obliquely front side of the vehicle 20 because of, e.g., a collision, the floor member 30 moves slightly toward the vehicle upper rear side with the shape kept, along the leg portion on the side opposite to the leg portion that the force acts on. Therefore, in the case of an oblique collision, also, it is possible to avoid a failure to protect a driver (occupant) due to the floor member 30 bending upward and it is also possible to avoid damage of the components (high-voltage components) under the floor member 30 due to the floor member 30 bending downward.

In the cab-over type vehicle 20 of the embodiment, as the interlocking shapes for interlocking between the upper base side portion 33 of the floor member 30 and the upper base matching portion 23 of the body 22, a recessed shape is formed at the upper base side portion 33 and a projecting shape is formed at the upper base matching portion 23. However, a projecting shape may be formed at the upper base side portion 33 and a recessed shape may be formed at the upper base matching portion 23. Also, since the upper base side portion 33 and the upper base matching portion 23 only need to interlock with each other, shapes other than the interlocking shapes that are a recessed shape and a projecting shape may be employed.

In the cab-over type vehicle 20 of the embodiment, as the inclined shapes at the lower base side portion 35 of the floor member 30 and the lower base matching portion 25 of the body 22, the inclined shapes each having an angle of 45 degrees from the vehicle lower front side to the vehicle upper rear side relative to a horizontal direction are formed. However, since it is only necessary that when a force acts on the floor member 30 from the vehicle front side, the lower base portion 34 of the floor member 30 be pushed up toward the vehicle upper rear side, the angle of the inclined shapes is not limited to 45 degrees but may be, e.g., 30 degrees, 40 degrees, 50 degrees or 60 degrees.

In the cab-over type vehicle 20 of the embodiment, the floor member 30 is formed such that the angle θ formed by each of the leg portions 36a, 36b and the upper base portion 32 is an angle that is 30 degrees larger than 90 degrees (that is, 120 degrees). However, also, it is only necessary that in the case of an oblique collision, the floor member 30 move slightly toward the vehicle upper rear side with the shape kept, and thus, the angle θ only needs to be an angle that is not less than the angle that is 30 degrees larger than 90 degrees (that is, no less than 120 degrees) and may be, for example, an angle that is 35 degrees larger than 90 degrees (125 degrees) or an angle that is 45 degrees larger than 90 degrees (135 degrees).

In the cab-over type vehicle 20 of the embodiment, the plurality of ribs 31a to 31o that project upward are formed at the floor member 30 with the vehicle front-rear direction as the longitudinal direction of the plurality of ribs 31a to 31o. However, since it is only necessary to enhance strength against buckling in the vehicle front-rear direction, a plurality of ribs 31a to 31o that project downward may be formed at the floor member 30 with the vehicle front-rear direction as a longitudinal direction of the plurality of ribs 31a to 31o, upwardly projecting ribs and downwardly projecting ribs may be alternately formed at the floor member 30 with the vehicle front-rear direction as a longitudinal direction of the ribs. Where upwardly projecting ribs and downwardly projecting ribs are alternately formed, the ribs may form a gently curved shape (waved shape) in section.

Correspondences between main elements of the embodiment and main elements of the disclosure stated in the Summary section will be described. In the embodiment, the driver seat 40 corresponds to "driver seat", the motor 50 corresponds to "electric motor", the floor member 30 corresponds to "floor member", the upper base side portion 33 corresponds to "upper base side portion", the upper base matching portion 23 corresponds to "upper base matching part", the lower base side portion 35 corresponds to "lower base side portion" and the lower base matching portion 25 corresponds to "lower base matching part".

The above correspondences between main elements of the embodiment and main elements of the disclosure stated in the Summary section are not intended to limit the main elements of the disclosure stated in the Summary section because the embodiment is an example for specifically describing a mode for carrying out the disclosure stated in the Summary section. In other words, interpretation of the disclosure stated in the Summary section should be made based on the statement in that section, and the embodiment is a mere specific example of the disclosure stated in the Summary.

Although a mode for carrying out the present disclosure has been described above using an embodiment, it should be understood that: the applicable embodiment is not limited to such embodiment in any way; and the present disclosure can be carried out in any of various modes without departing from the spirit of the disclosure.

The present disclosure is applicable in, e.g., the industry of manufacturing cab-over type vehicles.

What is claimed is:

1. A cab-over type vehicle including an electric motor for driving, the electric motor being disposed below a driver seat, comprising:
    a floor member under the driver seat that is a plate-like member with an isosceles trapezoidal shape in which an upper base is shorter than a lower base, and is attached to a body of the vehicle with the upper base facing in a vehicle front direction;
    respective interlocking shapes at an upper base side portion of the floor member and an upper base matching part that is a part of the body and matches the upper base side portion such that the upper base side portion and the upper base matching part interlock with each other;
    respective inclined shapes at a lower base side portion of the floor member and a lower base matching part that is a part of the body and matches the lower base side portion such that when a force acts on the floor member from a vehicle front side, the lower base of the floor member is pushed up toward a vehicle upper rear side; and
    a plurality of rib shapes that project upward or downward at the floor member with a longitudinal direction of the plurality of rib shapes in a vehicle front-rear direction, wherein
    one of the interlocking shapes at the upper base side portion of the floor member and the upper base matching part has a projecting shape and another of the interlocking shapes has a recessed shape.

2. The vehicle according to claim 1, wherein each of the inclined shapes at the lower base side portion of the floor member and the lower base matching part is a shape in which an angle from a vehicle front lower side to a vehicle upper rear side of the shape relative to a horizontal direction is 45 degrees.

3. The vehicle according to claim 1, wherein an angle formed by the upper base and a leg of the floor member is no less than 120 degrees.

4. The vehicle according to claim 1, wherein on an upper portion of the electric motor, the upper portion being located below the floor member, a housing portion that houses a high-voltage component is provided.

* * * * *